United States Patent
Cunha et al.

(10) Patent No.: US 10,386,066 B2
(45) Date of Patent: Aug. 20, 2019

(54) TURBINE ENGINE MULTI-WALLED STRUCTURE WITH COOLING ELEMENT(S)

(71) Applicant: United Technologies Corporation, Farmington, CT (US)

(72) Inventors: Frank J. Cunha, Avon, CT (US); Stanislav Kostka, Jr., Shrewsbury, MA (US)

(73) Assignee: United Technologies Corpoation, Farmington, CT (US)

( * ) Notice: Subject to any disclaimer, the term of this patent is extended or adjusted under 35 U.S.C. 154(b) by 177 days.

(21) Appl. No.: 15/032,190

(22) PCT Filed: Nov. 21, 2014

(86) PCT No.: PCT/US2014/066869
§ 371 (c)(1),
(2) Date: Apr. 26, 2016

(87) PCT Pub. No.: WO2015/077592
PCT Pub. Date: May 28, 2015

(65) Prior Publication Data
US 2016/0265774 A1    Sep. 15, 2016

Related U.S. Application Data

(60) Provisional application No. 61/907,609, filed on Nov. 22, 2013.

(51) Int. Cl.
*F23R 3/00* (2006.01)
*F23M 5/08* (2006.01)
(Continued)

(52) U.S. Cl.
CPC ............. *F23R 3/002* (2013.01); *F02C 7/18* (2013.01); *F02C 7/24* (2013.01); *F23M 5/085* (2013.01); *F23R 3/005* (2013.01); *F23R 3/007* (2013.01); *F23R 3/06* (2013.01); *F23R 3/44* (2013.01); *F05D 2220/32* (2013.01);
(Continued)

(58) Field of Classification Search
CPC .... F01D 5/189; F02C 7/18; F02C 7/24; F05D 2240/15; F05D 2240/35; F05D 2240/81; F05D 2260/201; F05D 2260/202; F05D 2260/22141; F05D 2260/231; F23M 5/085; F23R 3/002; F23R 3/005; F23R 3/007; F23R 3/06; F23R 3/44; F23R 3/46;
(Continued)

(56) References Cited

U.S. PATENT DOCUMENTS 4,265,085 A    5/1981    Fox et al.
5,461,866 A    10/1995   Sullivan et al.
(Continued)

OTHER PUBLICATIONS

Extended EP Search Report dated Oct. 27, 2016.

*Primary Examiner* — Scott J Walthour
(74) *Attorney, Agent, or Firm* — O'Shea Getz P.C.

(57) ABSTRACT

A multi-walled structure is provided for a turbine engine. This structure includes a shell with a textured first surface, and a heat shield with a second surface. The heat shield is attached to the shell. The first and the second surfaces vertically define a cooling cavity between the shell and the heat shield. The cooling cavity fluidly couples a plurality of cooling apertures defined in the shell with a plurality of cooling apertures defined in the heat shield.

19 Claims, 11 Drawing Sheets

(51) Int. Cl.
*F23R 3/06* (2006.01)
*F02C 7/18* (2006.01)
*F02C 7/24* (2006.01)
*F23R 3/44* (2006.01)

(52) U.S. Cl.
CPC .... *F05D 2240/35* (2013.01); *F05D 2260/201* (2013.01); *F05D 2260/202* (2013.01); *F05D 2260/22141* (2013.01); *F05D 2260/231* (2013.01); *F23R 2900/00017* (2013.01); *F23R 2900/03042* (2013.01); *F23R 2900/03044* (2013.01); *F23R 2900/03045* (2013.01)

(58) Field of Classification Search
CPC .............. F23R 3/50; F23R 2900/03041; F23R 2900/03042; F23R 2900/03044; F23R 2900/03045
See application file for complete search history.

(56) References Cited

U.S. PATENT DOCUMENTS

| | | | |
|---|---|---|---|
| 5,758,503 A | 6/1998 | DuBell et al. | |
| 6,237,344 B1 | 5/2001 | Lee | |
| 6,238,182 B1 * | 5/2001 | Mayer | F01D 5/189 415/115 |
| 6,408,628 B1 | 6/2002 | Pidcock et al. | |
| 6,708,499 B2 | 3/2004 | Pidcock et al. | |
| 7,093,441 B2 | 8/2006 | Burd et al. | |
| 7,146,815 B2 | 12/2006 | Burd | |
| 8,443,610 B2 | 5/2013 | Hoke et al. | |
| 2003/0213250 A1 | 11/2003 | Pacheco-Tougas et al. | |
| 2008/0063524 A1 | 3/2008 | Tibbott | |
| 2008/0134683 A1 | 6/2008 | Foale | |
| 2010/0077764 A1 * | 4/2010 | Dierberger | F23R 3/002 60/754 |
| 2010/0229563 A1 | 9/2010 | Woolford et al. | |
| 2010/0229564 A1 * | 9/2010 | Chila | F23R 3/06 60/752 |
| 2010/0242485 A1 * | 9/2010 | Davis, Jr. | F23R 3/002 60/752 |
| 2010/0287941 A1 | 11/2010 | Kim et al. | |
| 2011/0185735 A1 | 8/2011 | Snyder | |
| 2012/0272521 A1 | 11/2012 | Lee et al. | |
| 2013/0000309 A1 * | 1/2013 | Dierberger | F23R 3/002 60/752 |
| 2013/0047618 A1 | 2/2013 | Gregory | |
| 2016/0238249 A1 * | 8/2016 | Cunha | F23R 3/005 |

* cited by examiner

> US 10,386,066 B2

TURBINE ENGINE MULTI-WALLED STRUCTURE WITH COOLING ELEMENT(S)

CROSS-REFERENCE TO RELATED APPLICATIONS

This application claims priority to PCT Patent Application No. PCT/US14/066869 filed Nov. 21, 2014, which claims priority to U.S. Provisional Patent Appln. No. 61/907,609 filed Nov. 22, 2013, which are hereby incorporated herein by reference in their entireties.

BACKGROUND OF THE INVENTION

1. Technical Field

This disclosure relates generally to a multi-walled structure of a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield which defines a radial side of a combustion chamber. Cooling cavities extend radially between the heat shield and the shell. These cooling cavities fluidly couple impingement apertures defined in the shell with effusion apertures defined in the heat shield.

There is a need in the art for an improved turbine engine combustor.

SUMMARY OF THE DISCLOSURE

According to an aspect of the invention, a multi-walled structure is provided for a turbine engine. This structure includes a shell with a textured first surface, and a heat shield with a second surface. The heat shield is attached to the shell. The first and the second surfaces vertically define a cooling cavity between the shell and the heat shield. The cooling cavity fluidly couples a plurality of cooling apertures defined in the shell with a plurality of cooling apertures defined in the heat shield.

According to another aspect of the invention, another multi-walled structure is provided for a turbine engine. This structure includes a shell and a heat shield with a cooling cavity between the shell and the heat shield. The shell includes a cooling element that extends partially into the cooling cavity. The cooling cavity fluidly couples a plurality of cooling apertures defined in the shell with a plurality of cooling apertures defined in the heat shield.

According to another aspect of the invention, a combustor is provided for a turbine engine. The turbine engine combustor includes a tubular combustor wall. The wall includes a shell and a heat shield with a tapered cooling cavity between the shell and the heat shield. The shell includes a plurality of cooling elements that extend partially radially into the cooling cavity.

The cooling element may be one of a plurality of cooling elements that extend partially into the cooling cavity.

A second tapered cooling cavity may be defined between the shell and the heat shield. The shell may include a plurality of cooling elements that extend partially radially into the second cooling cavity.

The shell may include a base and a plurality of cooling elements connected to the base. The first surface may be defined by the base and the cooling elements.

One of the cooling elements may be configured as or otherwise include a cooling pin. One of the cooling elements may also or alternatively be configured as or otherwise include a nodule. One of the cooling elements may also or alternatively be configured as or otherwise include a rib. At least a portion of the rib may be configured as a chevron.

A density of the cooling elements in a first region of the first surface may be different than a density of the cooling elements in a second region of the first surface.

A density of the cooling elements may decrease as a vertical distance between the first and the second surfaces decreases.

The texture of the first surface may change as the first surface extends along the shell.

The first and the second surfaces may converge towards one another.

The heat shield may include first and second rails between which the cooling cavity is longitudinally defined. The cooling apertures may be defined in the heat shield at the first rail.

The heat shield may be configured such that substantially all air within the cooling cavity is directed through the cooling apertures defined in the heat shield at the first rail.

The shell may extend between the first surface and a textured third surface opposite the cooling cavity.

The shell may include a base and a plurality of cooling elements connected to the base opposite the first surface.

The shell and the heat shield may form a combustor wall.

The foregoing features and the operation of the invention will become more apparent in light of the following description and the accompanying drawings.

DETAILED DESCRIPTION OF THE INVENTION

Figure 1:
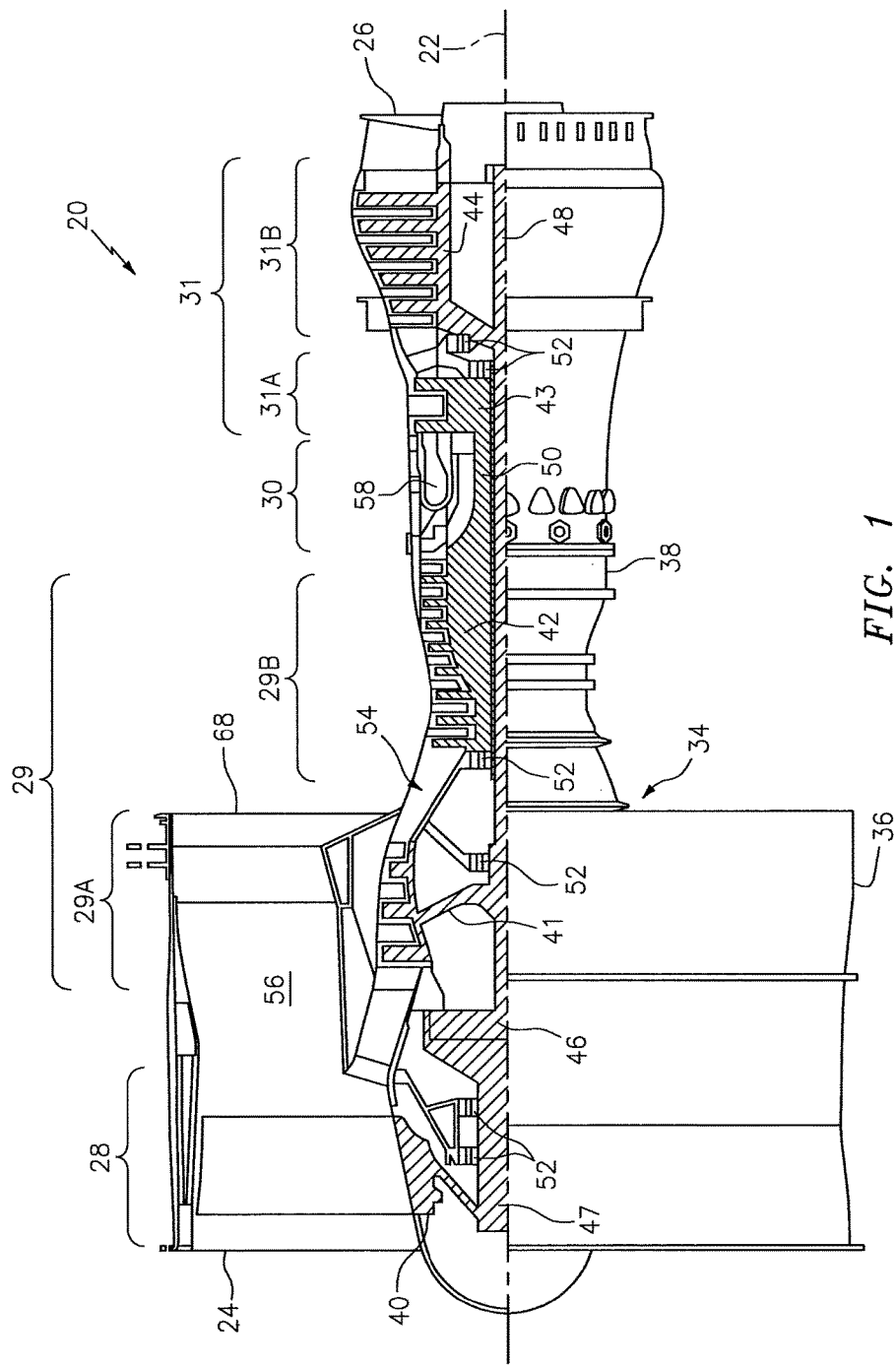
FIG. 1 is a side cutaway illustration of a geared turbine engine.

FIG. 1 is a side cutaway illustration of a geared turbine engine 20. This turbine engine 20 extends along an axial centerline 22 between a forward airflow inlet 24 and an aft airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 34, which includes a first engine case 36 and a second engine case 38.

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise attached to) one or more respective rotor disks. The fan rotor 40 is connected to a gear train 46 through a fan shaft 47. The gear train 46 and the LPC rotor 41 are connected to and driven by the LPT rotor 44 through a low speed shaft 48. The HPC rotor 42 is connected to and driven by the HPT rotor 43 through a high speed shaft 50. The shafts 47, 48 and 50 are rotatably supported by a plurality of bearings 52. Each of the bearings 52 is connected to the second engine case 38 by at least one stationary structure such as, for example, an annular support strut.

Air enters the turbine engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air".

The core air is directed through the engine sections 29-31 and exits the turbine engine 20 through the airflow exhaust 26. Within the combustor section 30, fuel is injected into a combustion chamber 58 and mixed with the core air. This fuel-core air mixture is ignited to power the turbine engine 20 and provide forward engine thrust. The bypass air is directed through the bypass gas path 56 and out of the turbine engine 20 through a bypass nozzle 60 to provide additional forward engine thrust. Alternatively, the bypass air may be directed out of the turbine engine 20 through a thrust reverser to provide reverse engine thrust.

Figure 2:
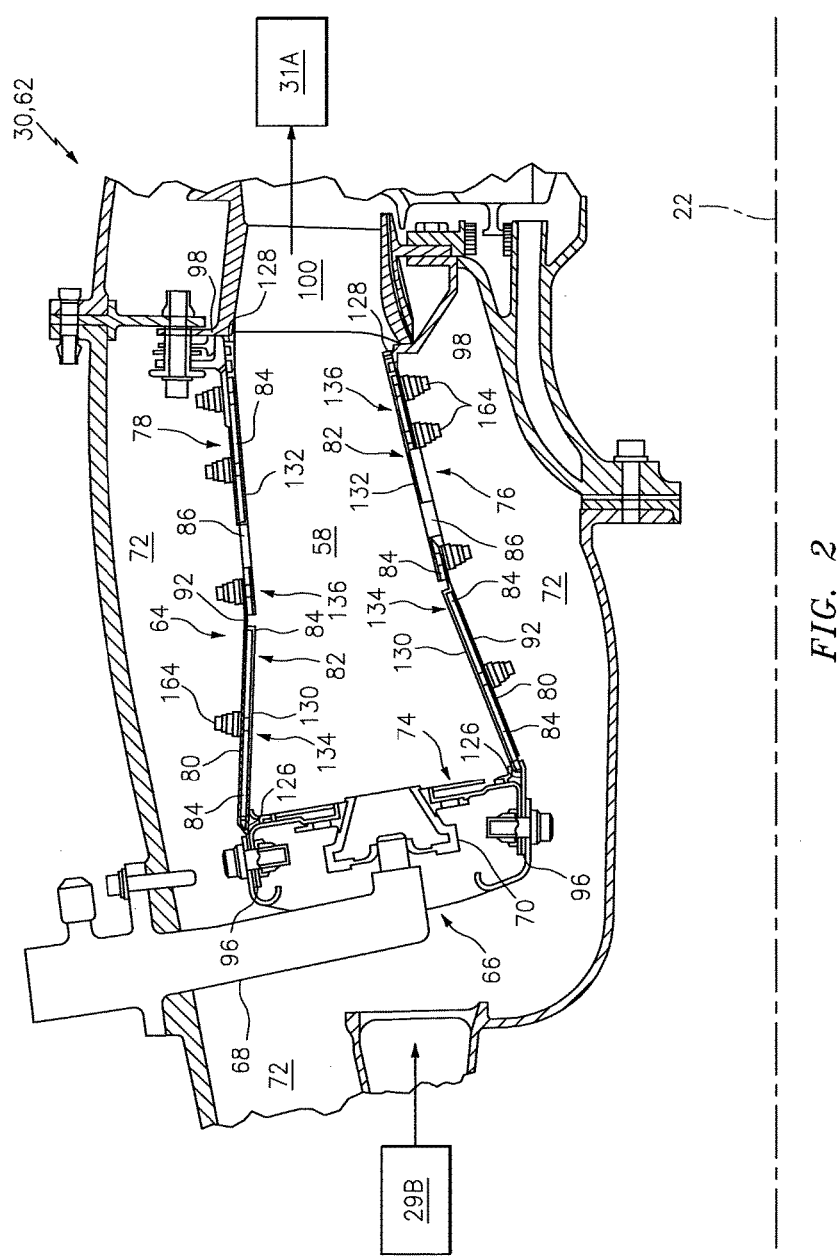
FIG. 2 is a side cutaway illustration of a portion of a combustor section.

FIG. 2 illustrates an assembly 62 of the turbine engine 20. This turbine engine assembly 62 includes a combustor 64. The turbine engine assembly 62 also includes one or more fuel injector assemblies 66, each of which may include a fuel injector 68 mated with a swirler 70.

The combustor 64 may be configured as an annular floating wall combustor arranged within an annular plenum 72 of the combustor section 30. The combustor 64 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the turbine section 31A, thereby defining the combustion chamber 58.

Figure 4:
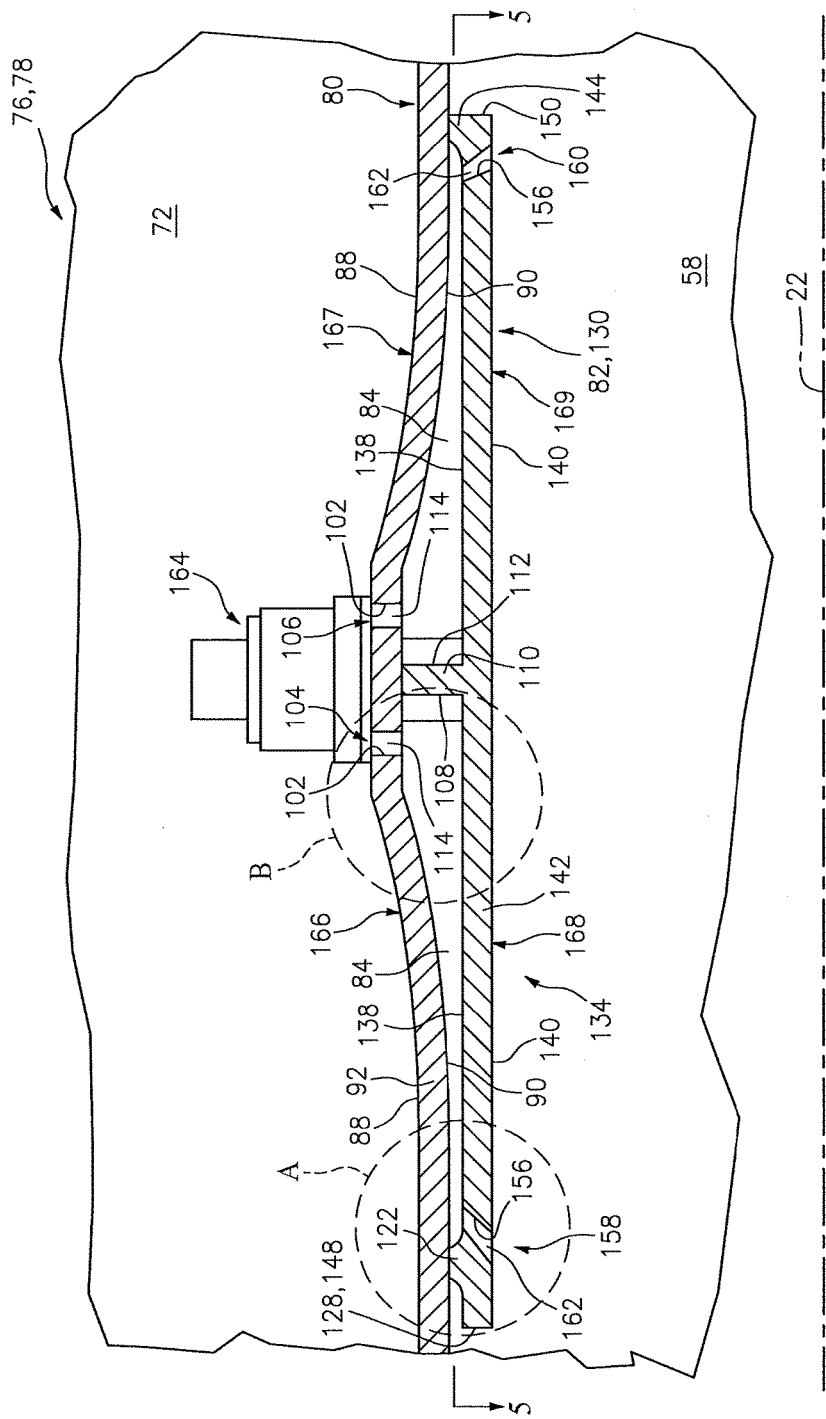
FIG. 4 is a side sectional illustration of a portion of a combustor wall.
Figure 5:
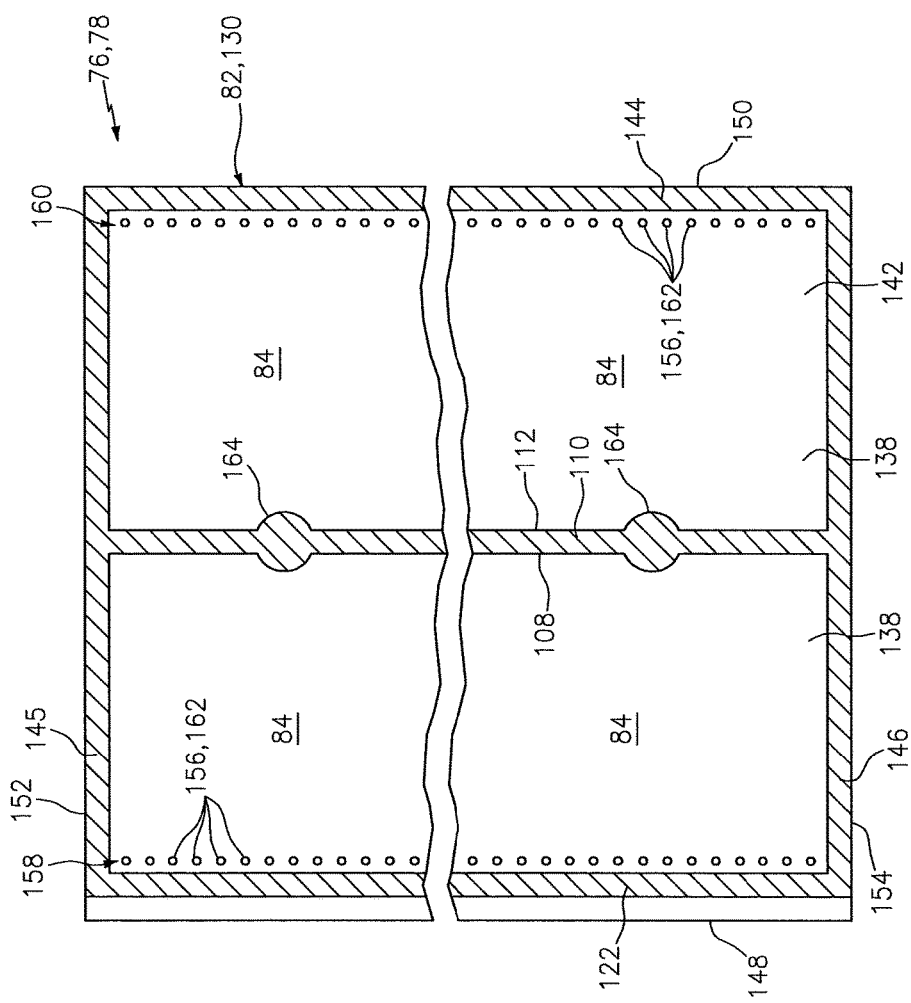
FIG. 5 is a circumferential sectional illustration of a portion of the combustor wall of FIG. 4.
Figure 6:
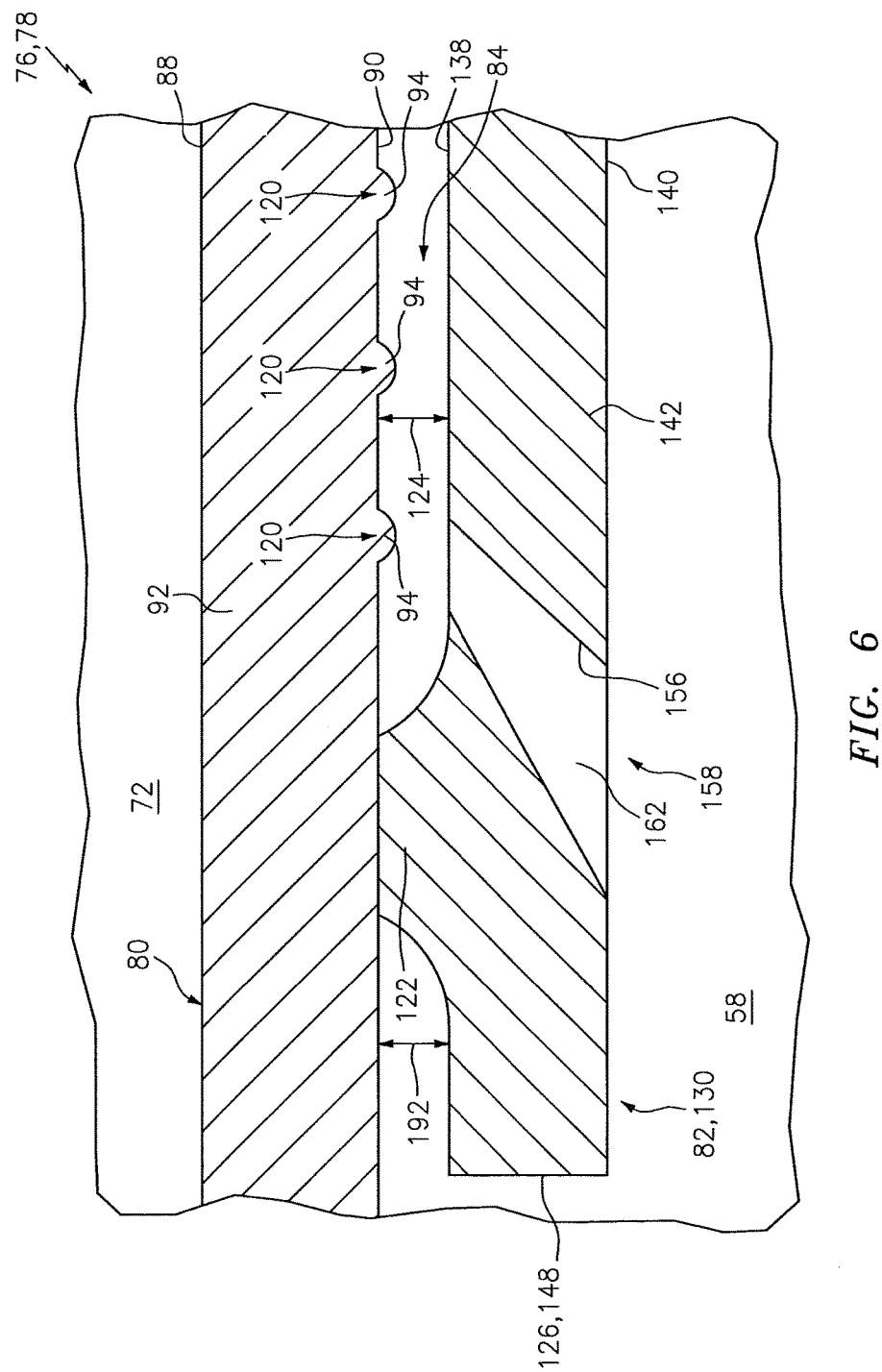
FIG. 6 is an enlarged side sectional illustration of a portion A of the combustor wall of FIG. 4.
Figure 7:
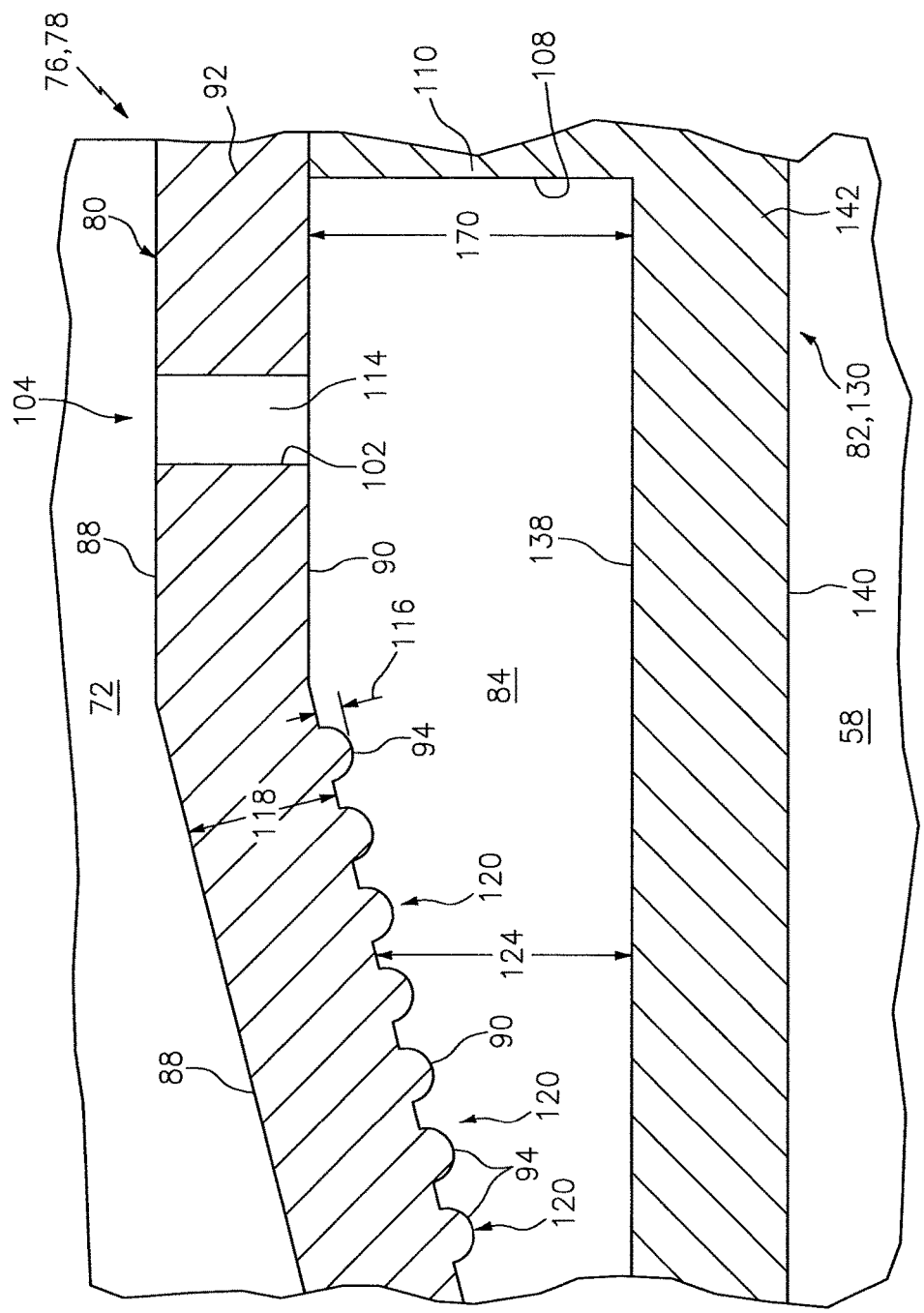
FIG. 7 is an enlarged side sectional illustration of a portion B of the combustor wall of FIG. 4.

FIG. 4 is a side sectional illustration of an exemplary forward portion of one of the walls 76, 78. FIG. 5 is a circumferential sectional illustration of a portion of the wall 76, 78 of FIG. 4. FIG. 6 is an enlarged side sectional illustration of a portion A of the wall 76, 78 of FIG. 4. FIG. 7 is an enlarged side sectional illustration of a portion B of the wall 76, 78 of FIG. 4. It should be noted that some details of the wall 76, 78 shown in FIGS. 6 and 7 are not shown in FIGS. 2, 4 and 5 for ease of illustration.

The inner wall 76 and the outer wall 78 may each be configured as a multi-walled structure; e.g., a hollow dual-walled structure. The inner wall 76 and the outer wall 78 of FIGS. 2 and 4, for example, each includes a tubular combustor shell 80, a tubular combustor heat shield 82, and one or more cooling cavities 84 (e.g., impingement cavities).

Figure 3:
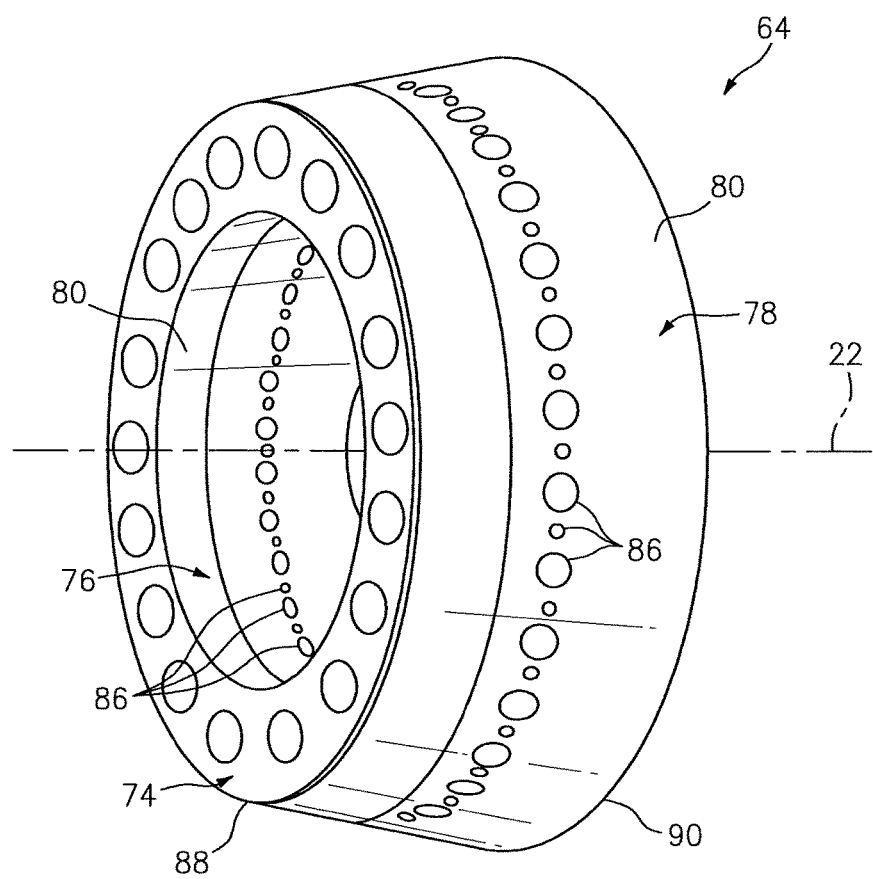
FIG. 3 is a perspective illustration of a portion of a combustor.

Referring now to FIG. 2, the inner wall 76 and the outer wall 78 may also each include one or more quench apertures 86, which extend through the wall 76, 78 and are disposed circumferentially around the centerline 22 (see FIG. 3).

Referring to FIGS. 4, 6 and 7, the shell 80 has a plenum surface 88 and a textured cavity surface 90. At least a portion of the shell 80 extends radially between the plenum surface 88 and the cavity surface 90. The plenum surface 88 defines a portion of the plenum 72. The cavity surface 90 defines a portion of one or more of the cavities 84.

The shell 80 includes a shell base 92 and one or more cooling elements 94 (see FIGS. 6 and 7). The shell base 92 may define the plenum surface 88. The shell base 92 and the cooling elements 94 may collectively define the cavity surface 90.

Referring to FIG. 2, the shell base 92 extends circumferentially around the centerline 22. The shell base 92 extends axially along the centerline 22 between a forward end 96 and an aft end 98. The shell 80 is connected to the bulkhead 74 at the forward end 96 of the shell base 92. The shell 80 may be connected to a stator vane assembly 100 or the HPT section 31A at the aft end 98 of the shell base 92.

Referring to FIG. 4, the shell base 92 has one or more aperture surfaces 102. These aperture surfaces 102 may be arranged in one or more aperture arrays 104 and 106. The aperture surfaces 102 in each aperture array 104, 106 may be disposed circumferentially around the centerline 22. A first of the aperture arrays 104 may be located proximate (or adjacent) to and on a first axial side 108 of one or more heat shield rails 110 (e.g., intermediate rails). A second of the aperture arrays 106 may be located proximate (or adjacent) to and on an opposite second axial side 112 of the one or more heat shield rails 110.

Referring to FIG. 7, each of the aperture surfaces 102 defines a cooling aperture 114. Each cooling aperture 114 extends (e.g., radially) through the shell 80 from the plenum surface 88 to the cavity surface 90. Each cooling aperture 114 may be configured as an impingement aperture. Each aperture surface 102 of FIG. 7, for example, is configured to direct a jet of cooling air to impinge substantially perpendicularly against the heat shield 82 as described below in further detail.

Referring to FIGS. 6 and 7, the cooling elements 94 are connected to the shell base 92 on a side of the base 92 that faces the heat shield 82. One or more of the cooling elements 94, for example, may be formed integral with the shell base 92. One or more of the cooling elements 94 may alternatively be welded, brazed, adhered, mechanically fastened or otherwise attached to the shell base 92. Referring to FIG. 7, each cooling element 94 extends from the shell base 92 to a distal end, thereby defining a cooling element height 116. This cooling element height 116 may be, for example, between about twenty-five percent (25%) and about sixty percent (60%) or more of a thickness 118 of the shell base 92. The present invention, however, is not limited to any particular cooling element sizes.

Referring to FIGS. 6 and 7, the cooling elements 94 may be arranged in one or more element arrays 120. The cooling elements 94 in each element array 120 may be disposed circumferentially around the centerline 22. One or more of the element arrays 120 may be arranged on the first axial side 108 of the heat shield rails 110. One or more of the element arrays 120 may be arranged on the second axial side 112 of the heat shield rails 110. It is also worth noting the cooling elements 94 of the arrays 120 on the side 112 may have a similar (or different configuration) as that described below with respect to the cooling elements 94 in the arrays 120 on the side 108.

The element arrays 120 on the side 108 may be distributed at discrete axial locations along the shell base 92 between one or more heat shield rails 122 (e.g., end rails) and the heat shield rails 110. The element arrays 120 may be distributed such that the texture of the cavity surface 90 changes as the surface 90 extends along the shell 80 between the rails 110 and 122. For example, a density of the cooling elements 94 may change (e.g., decrease) substantially continuously or intermittently as a vertical (e.g., radial) distance 124 between the shell 80 and the heat shield 82 decreases. The term "density" may describe a ratio of a quantity of the cooling elements 94 per square unit of cavity surface 90.

In the embodiment of FIGS. 6 and 7, a density of the cooling elements 94 in an upstream region of the cavity surface 90 (see FIG. 7) may be greater than a density of the cooling elements 94 in a downstream region of the cavity surface 90. (see FIG. 6). The cooling element density may be varied between regions by changing the quantity of cooling elements 94 included in the element arrays 120; e.g., increasing or decreasing distances between adjacent cooling elements 94 within the array 120. The cooling element density may also or alternatively be varied by increasing or decreasing distances between adjacent element arrays 120. Of course, in other embodiments, the cooling elements 94 may be substantially uniformly distributed between the rails 110 and 122.

Referring to FIG. 2, the heat shield 82 extends circumferentially around the centerline 22. The heat shield 82 extends axially along the centerline between a forward end 126 and an aft end 128. The forward end 126 is located at an interface between the wall 76, 78 and the bulkhead 74. The aft end 128 may be located at an interface between the wall 76, 78 and the stator vane assembly 100 or the HPT section 31A.

The heat shield 82 may include one or more heat shield panels 130 and 132, one or more of which may have an arcuate geometry. These panels 130 and 132 may be respectively arranged into one or more panel arrays 134 and 136. The panel arrays 134 and 136 are respectively arranged at discrete locations along the centerline 22. The panels 130 in the panel array 134 are disposed circumferentially around the centerline 22 and form a forward hoop. The panels 132 in the panel array 136 are disposed circumferentially around the centerline 22 and form an aft hoop. Alternatively, the heat shield 82 may be configured from one or more tubular bodied.

Referring to FIGS. 4 and 5, each of the panels 130 has one or more cavity surfaces 138 and a chamber surface 140. At least a portion of the panel 130 extends radially between the cavity surfaces 138 and the chamber surface 140. Each cavity surface 138 defines a portion of a respective one of the cooling cavities 84. The chamber surface 140 defines a portion of the combustion chamber 58.

Each panel 130 includes a panel base 142 and one or more panel rails (e.g., rails 110, 122 and 144-146). The panel base 142 and the panel rails 110, 122 and 144-146 may collectively define the cavity surfaces 138. The panel base 142 may define the chamber surface 140.

The panel base 142 may be configured as a generally curved (e.g., arcuate) plate. The panel base 142 extends axially between an axial forward end 148 and an axial aft end 150. The panel base 142 extends circumferentially between opposing circumferential ends 152 and 154.

The panel rails may include the axial intermediate and end rails 110, 122 and 144 and one more circumferential end rails 145 and 146. Each of the panel rails 110, 122 and 144-146 of the inner wall 76 extends radially in from the respective panel base 142; see also FIG. 2. Each of the panel rails 110, 122 and 144-146 of the outer wall 78 extends radially out from the respective panel base 142; see also FIG. 2. The axial intermediate and end rails 110, 122 and 144 extend circumferentially between and are connected to the circumferential end rails 145 and 146. The axial intermediate rail 110 is disposed axially (e.g., centrally) between the axial end rails 122 and 144. The axial end rail 122 is arranged at the forward end 148. The axial end rail 144 is arranged at the aft end 150. The circumferential end rail 145 is arranged at the circumferential end 152. The circumferential rail 146 is arranged at the circumferential end 154.

Referring to FIG. 4, each panel 130 may also have one or more aperture surfaces 156. These aperture surfaces 156 may be arranged in one or more aperture arrays 158 and 160. The aperture surfaces 156 in each aperture array 158, 160 may be disposed circumferentially around the centerline 22. Respective aperture surfaces 156 in a first of the aperture arrays 158 may be located adjacent (or in or proximate) the axial end rail 122. Respective aperture surfaces 156 in a second of the aperture arrays 160 may be located adjacent (or in or proximate) the axial end rail 144.

Figure 8:
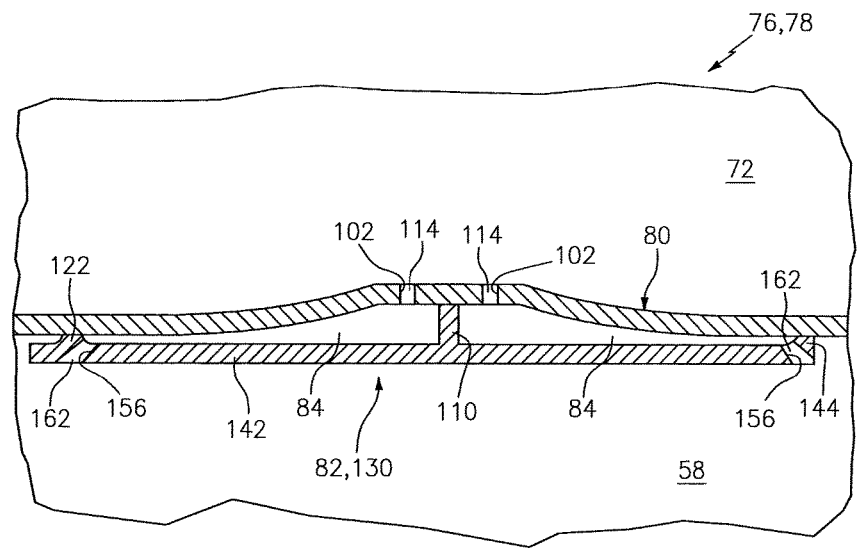
FIGS. 8 and 9 are side sectional illustrations of respective portions of alternate embodiment combustor walls.
Figure 9:
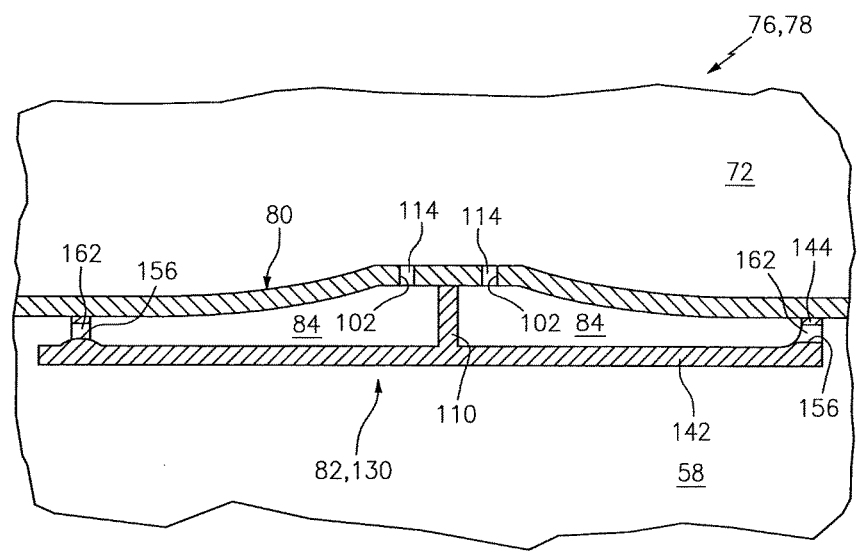

Referring to FIG. 6, each of the aperture surfaces 156 defines a cooling aperture 162. Each cooling aperture 162 may extend radially and axially (and/or circumferentially) through the panel base 142. Alternatively, referring to FIG. 8, one or more of the cooling apertures 162 may extend radially and axially (and/or circumferentially) through and be defined in the panel base 142 as well as a respective one of the end rails 122, 144. Referring to FIG. 9, one or more of the cooling apertures 162 may also or alternatively extend axially (and/or circumferentially) through and be defined in a respective one of the end rails 122, 144.

Referring to FIG. 4, one or more of the cooling apertures 162 may each be configured as an effusion aperture. Each aperture surface 156 of FIG. 4, for example, is configured to direct a jet of cooling air into the combustion chamber 58 such that the cooling air forms a film against a downstream portion of the heat shield 82 (and/or the bulkhead 74 of FIG. 2) as described below in further detail. One or more of the aperture surfaces 156 may also or alternatively each be configured to direct a jet of cooling air into the combustion chamber 58 towards the bulkhead 74 for film and/or impingement cooling the bulkhead 74.

Referring to FIG. 2, the heat shield 82 of the inner wall 76 circumscribes the shell 80 of the inner wall 76, and defines an inner side of the combustion chamber 58. The heat shield 82 of the outer wall 78 is arranged radially within the shell 80 of the outer wall 78, and defines an outer side of the combustion chamber 58 that is opposite the inner side. The heat shield 82 and, more particularly, each of the panels 130 and 132 may be respectively attached to the shell 80 by a plurality of mechanical attachments 164 (e.g., threaded studs respectively mated with washers and nuts); see also FIG. 4. The shell 80 and the heat shield 82 thereby respectively form the cooling cavities 84 in each of the walls 76, 78.

Referring to FIGS. 4 and 5, each of the cooling cavities 84 is defined radially by and extends radially between the cavity surface 90 and a respective one of the cavities surfaces 138 as set forth above. Each cooling cavity 84 is defined circumferentially by and extends circumferentially between the end rails 145 and 146 of a respective one of the panels 130. Each cooling cavity 84 is defined axially by and extends axially between the rails 110 and 122 or the rails 110 and 144 of a respective one of the panels 130. In this manner, referring to FIG. 4, each cooling cavity 84 may fluidly couple one or more of the cooling apertures 114 with one or more of the cooling apertures 162.

Respective portions 166-169 of the shell 80 and the heat shield 82 may converge towards one another; e.g., the shell portions 166 and 167 may include concavities. In this manner, the vertical distance 124 (see FIGS. 6 and 7) between the shell 80 and the heat shield 82 and, more particularly between the shell base 92 and the panel bases 142 may decrease as each panel 130 extends from the intermediate rail 110 to its axial end rails 122 and 144. Referring to FIGS. 6 and 7, a vertical height 170 of each intermediate rail 110, for example, may be greater than vertical heights (e.g., height 172) of the respective axial end rails 122 and 144. The height 172 of the axial end rail 122 of FIG. 6, for example, is between about twenty percent (20%) and about thirty-five percent (35%) of the height 170 of the intermediate rail 110 of FIG. 7. The shell 80 and the heat shield 82 of FIG. 4 therefore may define each cooling cavity 84 with a tapered geometry. However, in other embodiments, one or more of the cooling cavities 84 may be defined with non-tapered geometries (see FIG. 2).

Referring to FIGS. 4, 6 and 7, core air from the plenum 72 is directed into each cooling cavity 84 through respective cooling apertures 114 during turbine engine operation. This core air (e.g., cooling air) may impinge against the respective panel base 142, thereby impingement cooling the heat shield 82.

The cooling air may flow axially within the respective cooling cavity 84 from the cooling apertures 114 to the cooling apertures 162. The converging surfaces 90 and 138 may accelerate the axially flowing cooling air as it flows towards a respective one of the axial end rails 122 and 144. By accelerating the cooling air, thermal energy transfer from the heat shield 82 to the shell 80 through the cooling air may be increased. The thermal energy transfer from the heat shield 82 to the shell 80 may also be increased by the cooling elements 94. For example, the cooling elements 94 may increase convective thermal energy transfer from the cooling air to the shell 80 and, thus, from the heat shield 82 to the cooling air. In addition, the cooling elements 94 may turbulate the axially flowing cooling air, which can further increase convective thermal energy transfer.

Respective cooling apertures 162 may direct substantially all of the cooling air within the cooling cavity 84 into the combustion chamber 58. This cooling air may subsequently form a film that film cools a downstream portion of the heat shield 82; e.g., a downstream portion of the respective panel 130 and/or the panel 132 (see FIG. 2). The cooling air may also or alternatively provide film or impingement cooling to the bulkhead 74 (see FIG. 2).

Figure 10:
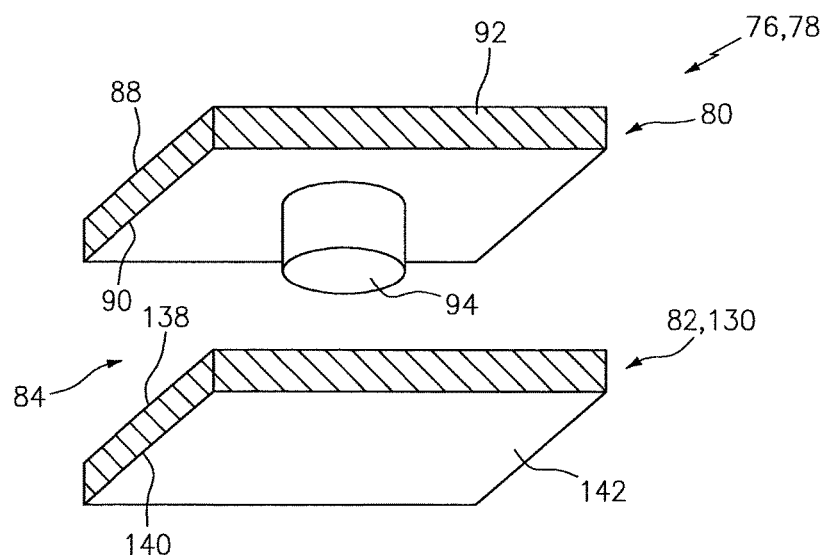
FIGS. 10-12 are perspective illustrations of respective portions of alternate embodiment combustor walls.

Referring to FIG. 10, in some embodiments, at least one of the cooling elements 94 may be configured as a cooling pin. The cooling element 94 of FIG. 10, for example, is configured as a generally cylindrical body that extends partially into the respective cooling cavity 84. In other embodiments, however, the cooling pin body may have a non-circular cross-section such as, for example, an oval cross-section, a rectangular or another type of polygonal cross-section, etc.

Figure 11:
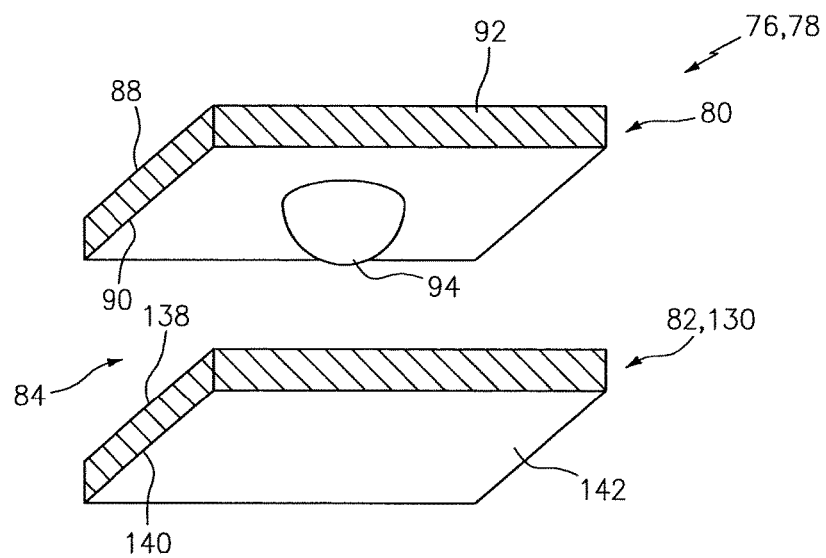

Referring to FIG. 11, in some embodiments, at least one of the cooling elements 94 may be configured as a nodule. The cooling element 94 of FIG. 11, for example, is configured as a parti-spherical (e.g., hemispherical) body that extends partially into the respective cooling cavity 84. In other embodiments, however, the cooling pin body may have an elongated parti-hemispherical body, a pyramidal body, a conical body, etc.

Figure 12:
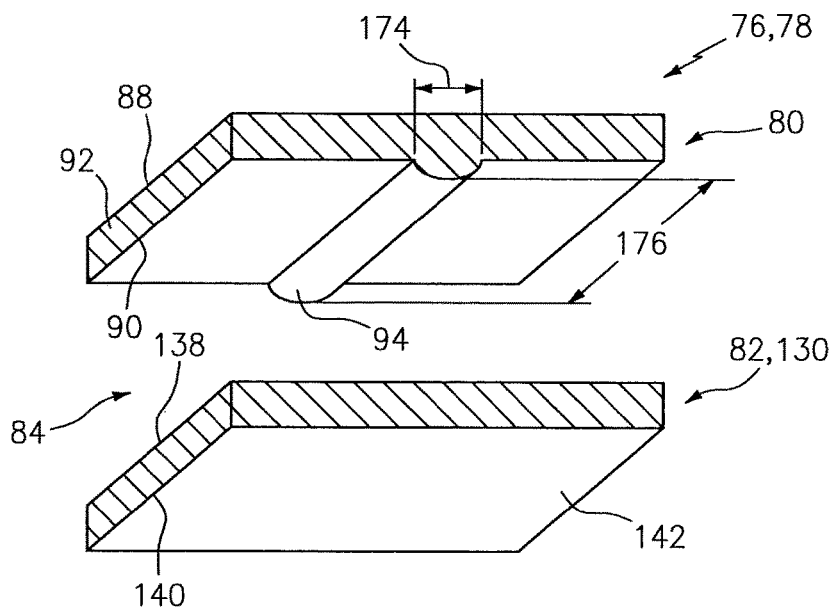

Referring to FIG. 12, in some embodiments, at least one of the cooling elements 94 may be configured as a rib; e.g., a trip strip. The cooling element 94 of FIG. 12, for example, has a lateral width 174 and a longitudinal length 176, which may extend circumferentially and/or axially along the shell base 92. The longitudinal length 176 may be, for example, at least about five times (5×) greater than the lateral width 174. The cooling element 94 of FIG. 12 has a parti-oval side-section. In other embodiments, however, the cooling element 94 may have a parti-circular side-section, a triangular, rectangular or another type of polygonal side-section, etc. In some embodiments, the shell 80 may include a plurality of the ribs (or other cooling elements). These ribs (or other cooling elements) may be axially aligned so as to collectively form a generally annular rib. Alternatively, the shell 80 may include an annular rib that extends circumferentially around the centerline 22.

Figure 13:
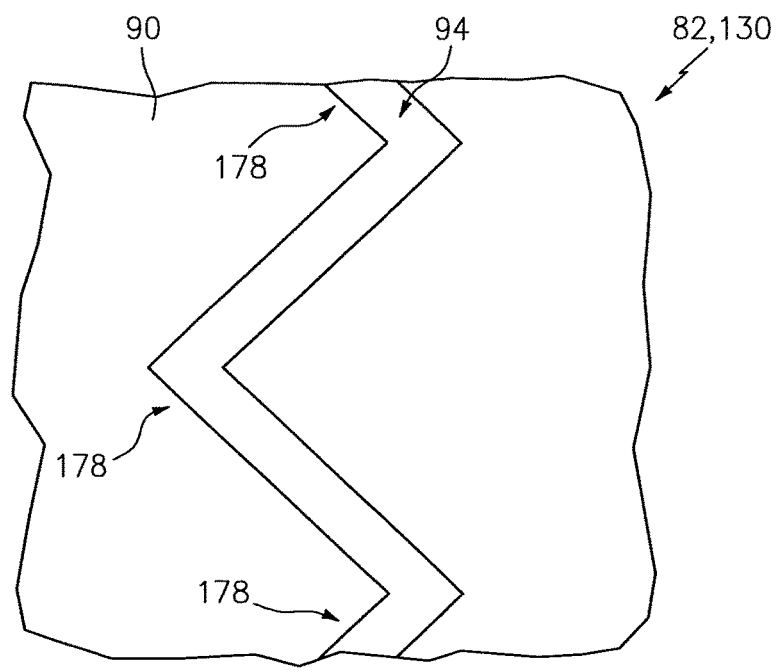
FIG. 13 is an illustration of a portion of a combustor wall shell.

In some embodiments, referring still to FIG. 12, the longitudinal length 176 of one or more of the cooling elements 94 may each follow a straight path. In other embodiments, however, the longitudinal length 176 of one or more of the cooling elements 94 may each follow a zigzagged, tortuous or otherwise convoluted path as illustrated in FIG. 13. The cooling element 94 of FIG. 13, for example, may include a plurality of circumferential portions 178. Each of these cooling element portions 178 may be configured as a chevron. The present invention, of course, is not limited to the foregoing example.

Figure 14:
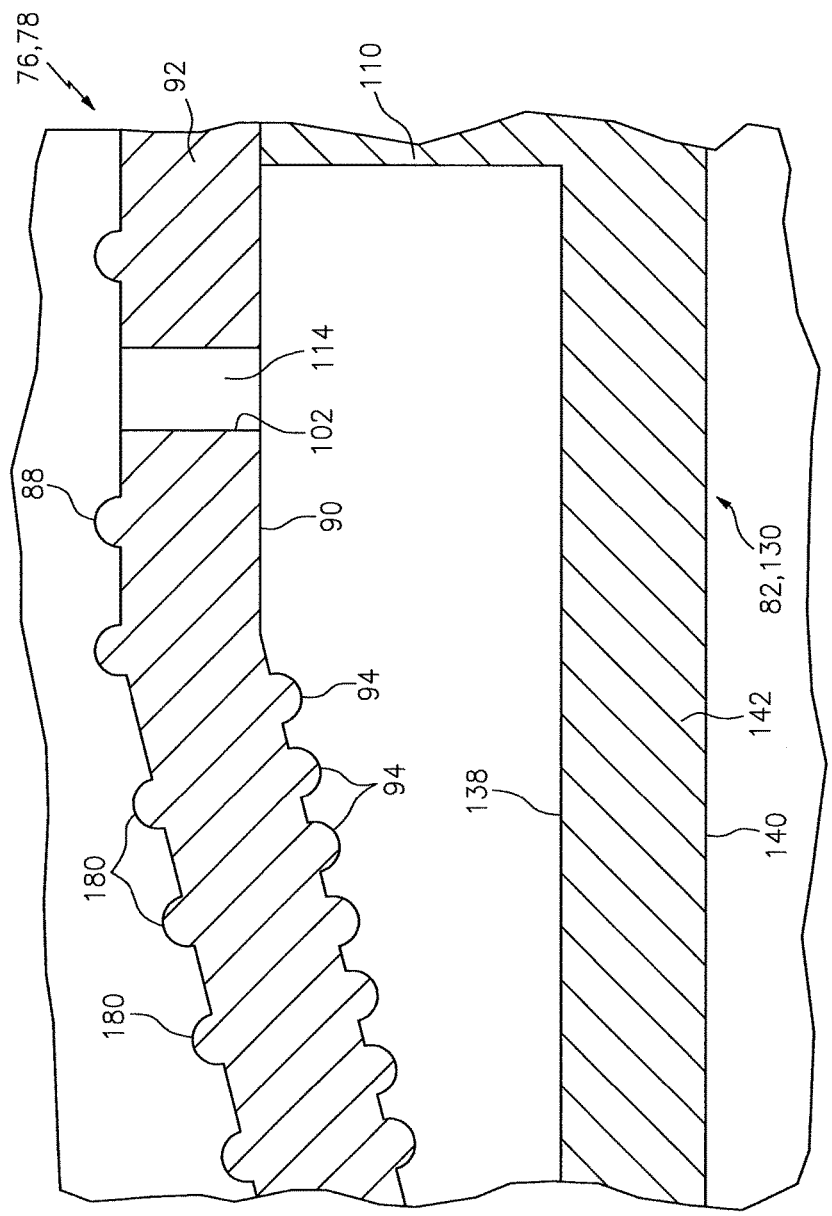
FIG. 14 is a side sectional illustration of a portion of an alternate embodiment combustor wall.

Referring to FIG. 14, in some embodiments, at least a portion of the plenum surface 88 may be textured by one or more cooling elements 180. These cooling elements 180 may increase convective thermal energy transfer from the shell 80 to the core air within the plenum 72. The cooling elements 180 are connected to the shell base 92, and may be positioned opposite the region(s) of the cavity surface 90 that include the cooling elements 94. One or more of the cooling elements 180 may have similar (or different) configurations as those described above with reference to the cooling elements 94.

The shell 80 and/or the heat shield 82 may each have a configuration other than that described above. In some embodiments, for example, a respective one of the heat shield portions 168, 169 may have a concavity that defines the cooling cavity 84 tapered geometry with the concavity of a respective one of the shell portions 166, 167. In some embodiments, a respective one of the heat shield portions 168, 169 may have a concavity rather than a respective one of the shell portions 166, 167. In some embodiments, one or more of the afore-described concavities may be replaced with a substantially straight radially tapering wall. In some embodiments, each panel 130 may define one or more additional cooling cavities with the shell 80. In some embodiments, each panel 130 may define a single cooling cavity with the shell 80, which cavity may taper in a forward or afterward direction. In some embodiments, one or more of the panels 132 may have a similar configuration as that described above with respect to the panels 130. In some embodiments, the configuration of the panels 130 and the panels 132 may be reversed. The present invention therefore is not limited to any particular combustor wall configurations.

In some embodiments, the bulkhead 74 may also or alternatively be configured with a multi-walled structure (e.g., a hollow dual-walled structure) similar to that described above with respect to the inner wall 76 and the outer wall 78. The bulkhead 74, for example, may include a shell, a heat shield, one or more cooling elements, and one or more cooling cavities. Similarly, other components (e.g., a gas path wall, a nozzle wall, etc.) within the turbine engine 20 may also or alternatively include a multi-walled structure as described above.

The terms "forward", "aft", "inner", "outer", "radial", circumferential" and "axial" are used to orientate the components of the turbine engine assembly 62 and the combustor 64 described above relative to the turbine engine 20 and its centerline 22. One or more of these components, however, may be utilized in other orientations than those described above. The present invention therefore is not limited to any particular spatial orientations.

The turbine engine assembly 62 may be included in various turbine engines other than the one described above. The turbine engine assembly 62, for example, may be included in a geared turbine engine where a gear train connects one or more shafts to one or more rotors in a fan section, a compressor section and/or any other engine section. Alternatively, the turbine engine assembly 62 may be included in a turbine engine configured without a gear train. The turbine engine assembly 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A multi-walled structure for a turbine engine, the multi-walled structure comprising:
   a shell and a heat shield with a cooling cavity that is between the shell and the heat shield, the shell comprising a base;
   wherein the shell includes a cooling element that extends partially into the cooling cavity; and
   wherein the cooling cavity fluidly couples a plurality of cooling apertures defined in the shell with a plurality of cooling apertures defined in the heat shield;
   wherein the cooling element extends from the base to a distal end of the cooling element thereby defining a cooling element height, and the cooling element height is between twenty-five percent and sixty percent of a thickness of the base.

2. The multi-walled structure of claim 1, wherein the cooling element is one of a plurality of cooling elements that extend partially into the cooling cavity.

3. The multi-walled structure of claim 1, wherein the shell and the heat shield converge towards one another.

4. A multi-walled structure for a turbine engine, the multi-walled structure comprising:
   a shell with a textured first surface; and
   a heat shield attached to the shell, the heat shield with a second surface;
   wherein the textured first surface and the second surface define a cooling cavity between the shell and the heat shield with the cooling cavity fluidly coupling a plurality of cooling apertures defined in the shell with a plurality of cooling apertures defined in the heat shield;
   wherein the shell includes a base and a plurality of cooling elements connected to the base, the plurality of cooling elements defining a texture of the textured first surface;
   wherein each respective cooling element of the plurality of cooling elements extends from the base to a distal end of the respective cooling element thereby defining a cooling element height, and the cooling element height of each respective cooling element is between twenty-five percent and sixty percent of a thickness of the base; and
   wherein the distal end of each respective cooling element is separated from the second surface by an air gap.

5. The multi-walled structure of claim 4, wherein a first of the plurality of cooling elements comprises a pin.

6. The multi-walled structure of claim 4, wherein a first of the plurality of cooling elements comprises a nodule.

7. The multi-walled structure of claim 4, wherein a first of the plurality of cooling elements comprises a rib.

8. The multi-walled structure of claim 7, wherein at least a portion of the rib is configured as a chevron.

9. The multi-walled structure of claim 4, wherein a density of the plurality of cooling elements in a first region of the textured first surface is different than a density of the plurality of cooling elements in a second region of the textured first surface.

10. The multi-walled structure of claim 4, wherein a density of the plurality of cooling elements decreases as a distance between the textured first surface and the second surface decreases.

11. The multi-walled structure of claim 4, wherein an arrangement of the plurality of cooling elements is configured such that the texture of the textured first surface changes as the textured first surface extends along the shell.

12. The multi-walled structure of claim 4, wherein the textured first surface and the second surface converge towards one another.

13. The multi-walled structure of claim 4, wherein
   the heat shield includes a first rail and a second rail between which the cooling cavity is longitudinally defined; and
   the plurality of cooling apertures are defined in the heat shield at the first rail.

14. The multi-walled structure of claim 13, wherein the heat shield is configured such that substantially all air within the cooling cavity is directed through the plurality of cooling apertures defined in the heat shield at the first rail.

15. The multi-walled structure of claim 4, wherein the base of the shell extends between the textured first surface and a textured third surface opposite the cooling cavity.

16. The multi-walled structure of claim 4, wherein the shell includes a plurality of second cooling elements connected to the base opposite the textured first surface.

17. The multi-walled structure of claim 4, wherein the shell and the heat shield form a combustor wall structure.

18. A combustor for a turbine engine, the combustor comprising:
   a multi-walled tubular combustor structure comprising a shell and a heat shield with a tapered cooling cavity between the shell and the heat shield, the shell comprising a base;

the shell including a first plurality of cooling elements that extend partially radially into the tapered cooling cavity;

wherein the tapered cooling cavity fluidly couples a plurality of cooling apertures defined in the shell with a plurality of cooling apertures defined in the heat shield;

wherein each respective cooling element of the first plurality of cooling elements extends from the base to a distal end of the respective cooling element thereby defining a cooling element height, and the cooling element height of each respective cooling element is between twenty-five percent and sixty percent of a thickness of the base.

19. The combustor of claim 18, wherein a second tapered cooling cavity is defined between the shell and the heat shield; and the shell further includes a second plurality of cooling elements that extend partially radially into the second tapered cooling cavity.

\* \* \* \* \*